Jan. 21, 1941. C. E. WESSELHOFF 2,229,319
VEHICLE POWER TRANSMISSION
Filed May 24, 1939 2 Sheets-Sheet 1

INVENTOR
Clarence E. Wesselhoff
BY Harness, Lind, Patti & Harris
ATTORNEYS.

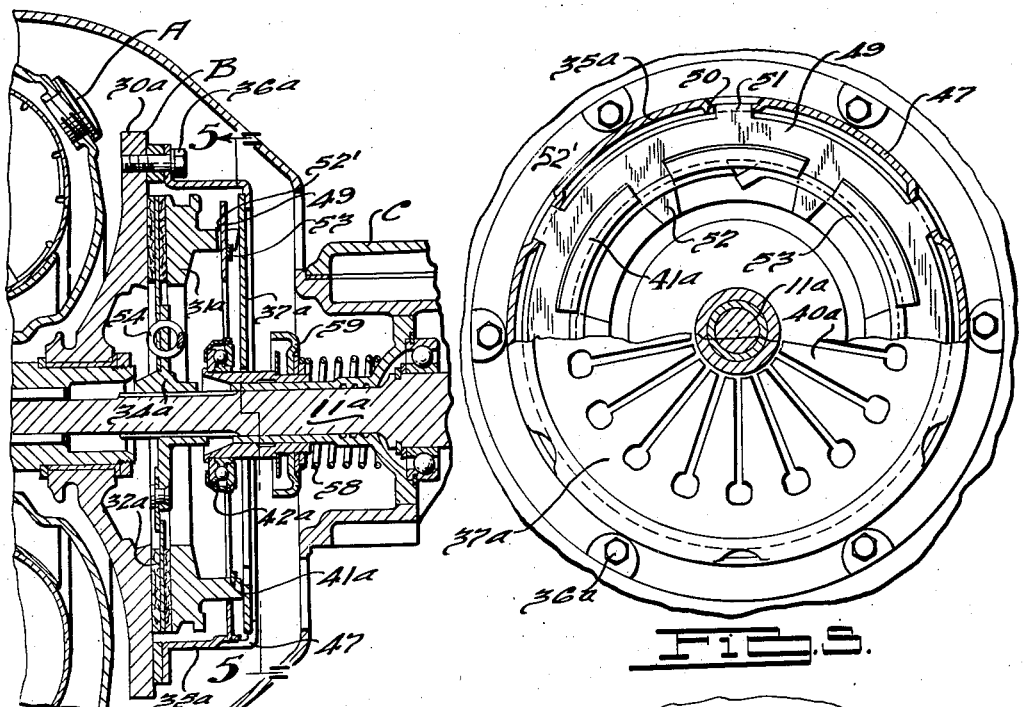
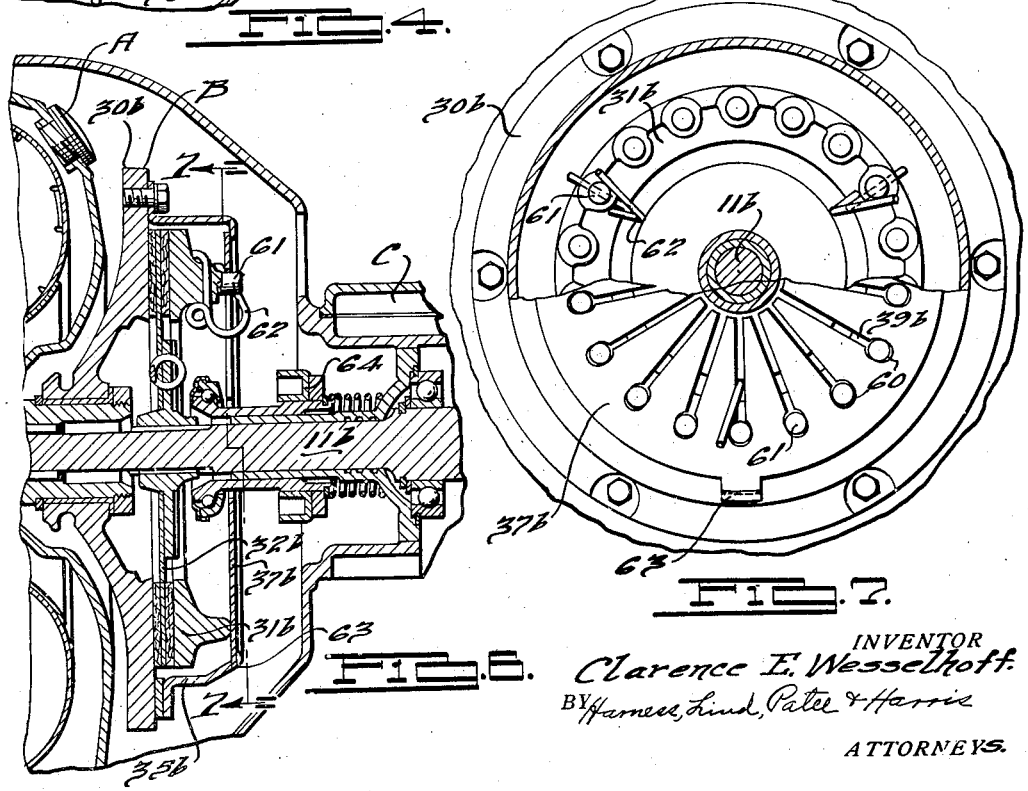

Patented Jan. 21, 1941

2,229,319

UNITED STATES PATENT OFFICE 2,229,319

VEHICLE POWER TRANSMISSION

Clarence E. Wesselhoff, Detroit, Mich., assignor to Chrysler Corporation, Highland Park, Mich., a corporation of Delaware Application May 24, 1939, Serial No. 275,388

4 Claims. (Cl. 192—68)

This invention relates to motor vehicles and particularly to improvements in the power transmitting mechanism thereof.

In motor vehicle power transmissions of the type embodying a fluid coupling for transmitting the drive from the engine to the change speed transmission it is usually necessary to provide means for disconnecting the drive when shifting gear ratios to prevent clashing. This disconnecting means is preferably located in the drive between the fluid coupling runner and the input shaft of the change speed transmission.

Numerous power transmission systems of the aforesaid type have been proposed and some have gone into use, but difficulty has been experienced in providing desired relationship of parts from standpoints of adequate bearing supports, freedom from binding of parts, and arranging the parts so that they do not require more room than is available.

Accordingly it is an object of the present invention to provide an improved system of power transmission of the type embodying a fluid coupling and a clutch which is more economical to manufacture, is more compact, employs a lesser number of parts, and is more efficient than any known in the art.

A further object of the invention is to provide an improved friction clutch which is more compact, less costly to manufacture, require a lesser number of parts and is more efficient than those known in the art.

Further objects and advantages of the invention will be apparent as this description progresses.

Referring to the accompanying drawings in which like reference numerals designate corresponding parts referred to in the following description:

Fig. 4 is a longitudinal sectional view of a modified form of the invention.

Fig. 5 is a sectional view along line 5—5 of Fig. 4.

Fig. 6 is a longitudinal sectional view of a further modification, and

Fig. 7 is a sectional view along line 7—7 of Fig. 6.

Figure 1:
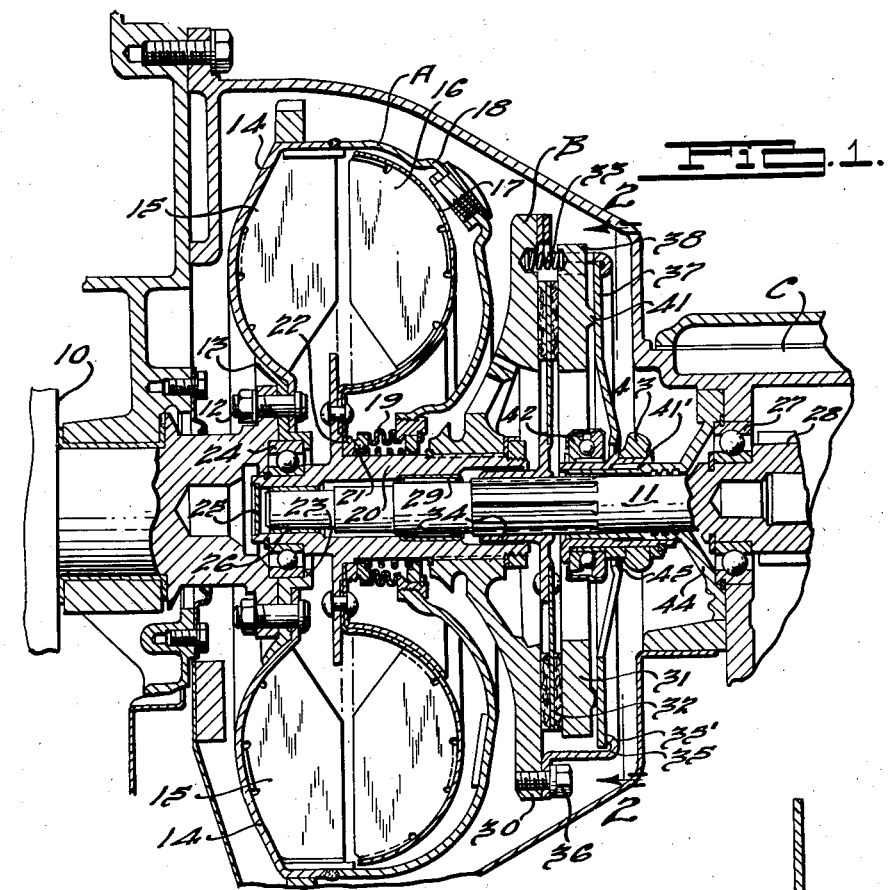
Fig. 1 is a longitudinal sectional elevational view of the fluid coupling and clutch assembly.
Figure 2:
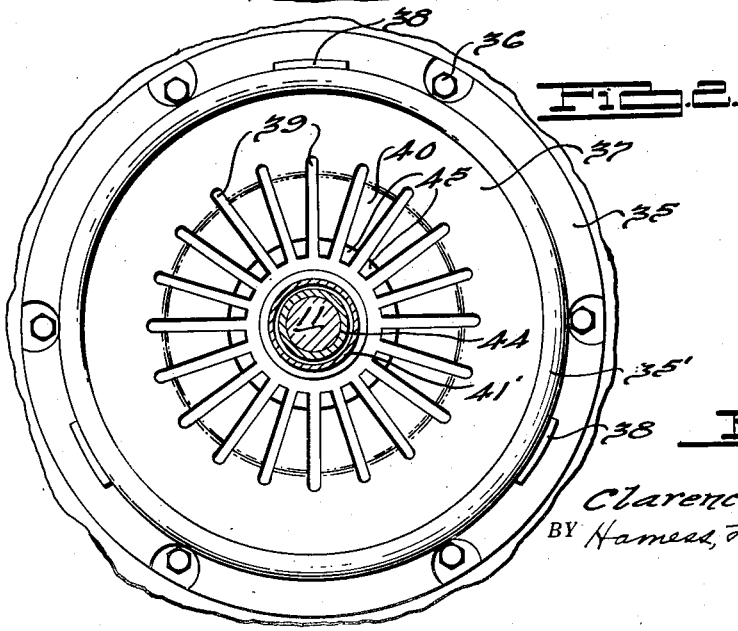
Fig. 2 is a sectional view along line 2—2 of Fig. 1.

Referring to Figs. 1 and 2, 10 designates the rear end of the engine crankshaft which is the drive shaft for the power transmission unit about to be described. The drive of the crankshaft 10 is adapted to be transmitted through a fluid coupling A and clutch B to the change speed transmission C which has an input shaft 11. The fluid coupling A is of the well known kinetic type, but other types of fluid couplings, such as the reaction turbine type or other types, may be employed.

The change speed transmission C may be of the well known manual control type or it may be of the automatic type. If desired, the transmission C may be dispensed with and the shaft 11 may be arranged to drive the vehicle ground wheels (not shown) directly without passing through any ratio changing mechanism.

Secured to the rear end of crankshaft 10 by the fasteners 12, I have provided a supporting journalling member 13 on which is drivingly mounted the impeller structure 14 of fluid coupling A, this impeller having the usual radially extending vanes 15 for directing the fluid medium by the action of centrifugal force toward corresponding vanes 16 of the runner structure 17 whereby to transmit the drive from the impeller to the runner in the well known manner. The impeller 14 extends rearwardly and inwardly through the shrouding or cover portion 18 thereby enclosing the runner 17 and in order to seal the fluid coupling against escape of the fluid I have provided the sealing structure 19 between the shrouding 18 and the hollow hub 20 on which the runner 17 is drivingly mounted, it being understood that the runner is adapted to rotate relative to the impeller and its shrouding 18. The sealing structure 19 rotates with the shrouding 18 and is provided with a sealing ring 21 which rotatably engages a companion sealing member 22 carried by the hollow hub 20 in order to accommodate this relative rotation between the impeller and runner while preventing the escape of fluid from the coupling A.

The support member 13 has a portion 23 thereof which extends rearwardly within the fluid coupling and carries an anti-friction bearing 24 providing a journal support for the forwardly extending end of the hub 20 which extends forwardly within the portion 23 of the supporting member 13. The forward end of hub 20 is closed by a plug 25 for preventing escape of the fluid from the coupling at this point. Located preferably concentrically within the bearing 24, a bushing 26 journals the forward end of the input shaft 11, the rear end of this shaft being supported by a bearing 27 carried by the housing of the transmission C. The rear end of shaft 11 may have the usual input gear 28 for transmitting the drive to the transmission C.

The hollow hub 20 extends rearwardly preferably with clearance with respect to the shrouding 18, the rear end of the hub being journaled by a bearing 29 of the anti-friction roll type. Fixed to the rear end portion of the hollow hub 20 so as to surround the bearing 29 is the driving member 30 of the friction clutch B.

The clutch driven disc 32 is carried by a hub 34 drivingly secured to the input shaft 11 adjacent the rear end of hollow hub 20. A plurality of coil springs 33 disposed in juxtapositioned pockets of the members 30 and 31 urge the pressure plate 31 to disengaged position.

An annular cover member 35 is fastened to the pressure plate 30 at a plurality of points by bolts 36. This cover member has a reversely turned flange portion 35' and is provided with a plurality of slots in which the driving lugs 38 of the pressure plate are received.

Figure 3:
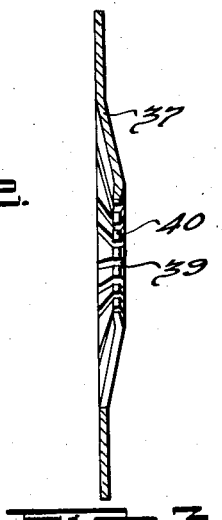
Fig. 3 is a sectional elevational view of the diaphragm spring used in the clutch of Figs. 1 and 2.

A diaphragm spring 37 loosely surrounds the shaft 11 as shown in Figs. 1 and 2 and forms the pressure spring for keeping the clutch engaged as well as a means for controlling the engagement and disengagement thereof. Fig. 3 is an axial longitudinal sectional view of the spring which has the shape of a dished washer and is provided with a series of slots 39 between which are the integrally formed fingers 40.

Fig. 1 shows the clutch B in engaged or driving position with the spring 37 exerting a forward thrust on the raised ridge 41 of the pressure plate 31. The reaction of the spring is taken through the outer marginal portion thereof which contacts the inturned edge of the flange 35' of the cover 35. The parts are adjusted during assembly so that full driving pressure will be exerted on the pressure plate 31 when the spring 37 is free as illustrated in Fig. 1. It can thus be seen that drive from the hub 20 will be transmitted to the shaft 11 through the members 30 and 31 which are drivingly connected by the lugs 38 and the driven disc 32 which is riveted to the hub 34, the latter being splined on the shaft 11.

The mechanism for disengaging clutch B comprises a hub member 41' slidably carried by the sleeve portion of member 44 which surrounds the shaft 11 and is fixed to the forward inner wall of the transmission casing. The hub 41' carries a throw-out bearing 42 of the usual ball type and is adapted to receive the fingers of a fork 43, the latter being adapted to be manipulated by the usual linkage under control of a suitable pedal (not shown).

Disengagement of the clutch B is effected by moving the hub member 41' rearwardly, or toward the right of Fig. 1, whence the bearing 42 will be forced against the inner flange 45 of the diaphragm spring 37 causing the spring to pivot on the annular flange 35' of cover member 35 and through diaphragm action release the pressure from the ridge 41 of pressure plate 31 thus permitting the clutch release springs 33 to move the pressure plate 31 out of driving contact with the disc 32. Release of the fork 43 allows the hub 41' to be moved forwardly by the usual pedal return spring (not shown) and moves the throw-out bearing 42 out of contact with the inner ends of the fingers 40. Because of the inherent "spring" or tension the member 37 then pivots about the portion 35' of cover 35 and exerts pressure on the pressure plate at 41.

In the operation of the mechanism, the crankshaft 10 and the impeller structure 14 rotate in unison causing the fluid in the coupling A to rotate the runner 17 thereby driving the hollow hub 20 and the driving member 30 of clutch B. When this clutch is engaged, as illustrated, the drive passes through the driven disc 32 to the input shaft 11 and thence through the mechanism C to drive the vehicle. The fluid coupling A will ordinarily provide sufficient inherent slip at low speeds so that when the engine is idling the clutch B may be left engaged and the mechanism C in driving condition without any drive passing from the crankshaft 10 to the runner structure 17 and the hollow hub 20. However, in order to facilitate manipulation of the mechanism C for changing gears therein, as when the car is being driven, the clutch B is preferably disengaged during the time of speed ratio changes in order to facilitate such changes without tendency to clash the gears. Also at any time when it is desired to interrupt the drive from the crankshaft 10 to the driving wheels of the vehicle the driver may bring this about by disengaging the clutch B by operation of the throw-out mechanism 43.

The fluid coupling A is preferably employed in the system by reason of its slipping characteristics which cushion and dampen the drive through the power transmission system as a whole and also because of the desirable operating characteristics of the fluid coupling which, in general, are well known in affording desirable accelerating characteristics of the motor vehicle as well as providing additional advantages. While the forward end of the hollow hub 20 may, if preferred, be rotatably supported directly by the crankshaft 10, I preferably support this hub by the crankshaft through the medium of the support member 13.

By reason of my novel arrangement of parts including the various bearings, the parts of the power transmission illustrated in Fig. 2 have improved stability without tendency toward objectionable vibration and misalignment of the parts. The input shaft 11, for example, is advantageously arranged in that it extends between the transmission C and crankshaft 10 being journalled at the latter location by the concentrically arranged bearings 26 and 24 through the medium of the forward portion of the hollow hub 20 which, in turn, is given improved stability by reason of the widely spaced bearings 26 and 29 on the input shaft 11.

Figs. 4 and 5 illustrate a slightly modified form of the clutch B. Parts corresponding to similar parts in the form previously described are designated by the same reference numerals with the suffix a appended thereto.

In Figs. 4 and 5, the cover member 35a is connected to the drive member 30a by bolts 36a and to the pressure plate 31a through the intermediary of a diaphragm drive member 49. The latter is of dished annular shape and is made from thin stock as indicated in Fig. 5. The member 49 is provided with two sets of driving lugs, one set designated 51 being received in the spaced slots 50 cut in radially inwardly depressed portions of the cover 35a. The other set of lugs designated 52 are received in spaced slots 52' cut in the ridge portion 41a of the pressure plate. A snap washer 53 is provided to retain the member 49 in position and prevent rattle. The member 49 is assembled in the structure by inserting it and the pressure plate 41a in assembled relation into the cover 35a with the lugs 51 in contact with the portion 47 of the cover plate that is intermediate the slots 50. The member 49 is then rotated until the lugs 51 are adjacent the slots 50 and moved forwardly. The diaphragm spring 37a is then sprung into place between the ridge 41a of the pressure plate and the portions 47 of the cover. The latter is similar to that of Fig. 1 except that it is flat as indicated in Fig. 4. The member 49, as aforesaid, is of dished shape and when assembled in the clutch structure, the lugs 52 continually urge the pressure plate 31a away from the disc 32a.

In the form of the invention just described, the drive is transmitted from the member 30a to the pressure plate 31a through the cover 35a and the lugs 51 and 52 of diaphragm member 49. The clutch driven disc 32a is drivingly connected to the hub 34a through a plurality of coil cushioning springs 54 instead of rivets as in the aforesaid form of the invention. These springs may be omitted if desired and rivets or other rigid fastening means substituted when a fluid coupling is used in conjunction with the clutch, because the latter will inherently provide sufficient resilience to prevent shock upon engagement of the clutch B.

In Fig. 4 the clutch is shown in engaged position and the driving member 49 is flat. When disengaged, the lugs 52 of member 49 are bowed rearwardly. In other words, member 49 acts as a retracting spring as well as a drive transmitting member.

The clutch release mechanism generally designated by numeral 59 is similar to that of Fig. 1. Upon rearward movement of the release mechanism, the bearing 42a contacts the fingers 40a of the diaphragm 37a thereby releasing the pressure plate 31a and permitting the member 49 to disengage plate 31a from driven disc 32a. A coil spring 58 is provided to maintain the release mechanism in the Fig. 4 position during normal operation and to prevent rattle.

Figs. 6 and 7 illustrate a further modification in which the diaphragm spring 37b forms the driving connection between the cover 35b and the pressure plate 31b as well as providing spring pressure for driving engagement of the clutch. As is apparent from Figs. 6 and 7, the slots 39b of the diaphragm 37b terminate in enlarged holes 60 which are adapted to receive the lugs 61 formed on the pressure plate 31b, and a plurality of lugs 63 formed integrally on the member 37b are received in complementary slots cut in the cover 35b.

The drive from the engine is thus transmitted from the member 30b to the pressure plate 31b through the cover 35b and the diaphragm 37b, the latter also supplying the necessary driving pressure on pressure plate 31b.

A plurality of springs 62 mounted in the lugs 61 at three or more points in rear of the diaphragm member 37b protrude through the corresponding slots of the latter and are hooked around the lugs near the rear face of the pressure plate as shown in Fig. 6. The springs 62 serve as retaining pins for disengaging the pressure plate 37b from the driven disc 32b upon rearward movement of the fork 64, and prevent rattle of the parts.

While the various forms of the invention have been described herein for use with a fluid coupling, it is desired to point out that my novel clutch is equally useful in motor vehicle or other drives where no fluid coupling is used and it is not intended to limit the invention in its broader aspects to drives including a fluid coupling as an element thereof. Because of its low cost, compactness and small number of parts, my improved clutch is particularly applicable for use in all types of installations where frequent interruption of drive between a prime mover and a driven mechanism is necessary.

Furthermore, it is not desired, nor is it intended, to limit the invention to any particular combination or arrangements of parts such as shown and described for illustrative purposes since various modifications will be apparent from the teachings of the invention and the scope thereof as defined in the appended claims.

I claim:

1. In a clutch, a driving member; an axially extending cover member carried by said driving member; a pressure plate drivingly connected to said driving member and reciprocable axially relative thereto; a driven disc disposed between said driving member and said pressure plate; a flexible diaphragm member having an outer marginal portion engaging said cover member, and an inner portion engaging said pressure plate and normally urging the same away from said driving member, and means for yieldably maintaining said pressure plate in driving contact with said disc.

2. In a clutch, a driving member; an axially extending cover member carried by said driving member; a pressure plate reciprocable axially of said driving member; a driven disc disposed between said driving member and said pressure plate; means drivingly connecting said cover member and said pressure plate comprising an annular flexible diaphragm member having driving lugs in engagement with said cover member and said pressure plate respectively, said diaphragm member yieldably urging said pressure plate away from said driving member; and a second diaphragm member acting between said cover member and pressure plate and yieldably urging said plate toward said driving member.

3. In a clutch, a driving member; an axially extending cover member carried by said driving member; a pressure plate reciprocable axially of said driving member; a driven disc disposed between said driving member and said pressure plate; means drivingly connecting said cover member and said pressure plate comprising an annular flexible diaphragm member having driving lugs in engagement with said cover member and said pressure plate respectively, said diaphragm member yieldably urging said pressure plate away from said driving member; and means for normally yieldably maintaining said pressure plate in driving contact with said driving disc.

4. In a clutch, a driving member; an axially extending cover member carried by said driving member; a pressure plate reciprocable axially of said driving member; a driven disc disposed between said driving member and said pressure plate; means drivingly connecting said cover member and said pressure plate comprising an annular flexible diaphragm member having driving lugs in engagement with said cover member and said pressure plate respectively, said diaphragm member yieldably urging said pressure plate away from said driving member; and a second diaphragm member acting between said cover member and pressure plate and yieldably urging said plate toward said driving member, and means operably associated with said second diaphragm member for releasing the pressure thereof.

CLARENCE E. WESSELHOFF.